(12) United States Patent
Whitehead et al.

(10) Patent No.: US 9,835,047 B2
(45) Date of Patent: Dec. 5, 2017

(54) TEST BLADE (71) Applicant: ROLLS-ROYCE PLC, London (GB)

(72) Inventors: Christopher M Whitehead, Derby (GB); Ewan F Thompson, Derby (GB); Paul J Mason, Derby (GB); Jeremy N Turner, Nottingham (GB)

(73) Assignee: ROLLS-ROYCE plc, London (GB)

( * ) Notice: Subject to any disclaimer, the term of this patent is extended or adjusted under 35 U.S.C. 154(b) by 383 days.

(21) Appl. No.: 14/693,171

(22) Filed: Apr. 22, 2015

(65) Prior Publication Data
US 2015/0330246 A1 Nov. 19, 2015

(30) Foreign Application Priority Data
May 13, 2014 (GB) .................................. 1408463.6

(51) Int. Cl.
F01D 21/04 (2006.01)
F01D 5/18 (2006.01)
F01D 5/30 (2006.01)

(52) U.S. Cl.
CPC ............ F01D 21/045 (2013.01); F01D 5/18 (2013.01); F01D 5/3007 (2013.01); F05D 2220/30 (2013.01); F05D 2240/30 (2013.01); F05D 2260/83 (2013.01); Y02T 50/672 (2013.01); Y10T 29/49334 (2015.01)

(58) Field of Classification Search
CPC ........ F01D 21/003; F01D 21/045; F01D 5/30; F01D 5/3007; F05D 2260/83; G01M 15/14
USPC ................................ 73/35.14, 116.01, 116.03
See application file for complete search history.

(56) References Cited

U.S. PATENT DOCUMENTS

| | | | | |
|---|---|---|---|---|
| 4,480,957 A | * | 11/1984 | Patel | ........................ F01D 5/16 416/219 R |
| 4,802,824 A | * | 2/1989 | Gastebois | ............... F01D 5/282 416/193 A |
| 5,314,307 A | | 5/1994 | Farmer | |
| 2010/0158693 A1 | * | 6/2010 | Viegas | .................... F01D 5/282 416/223 R |
| 2012/0027605 A1 | * | 2/2012 | Cordier | .................... F01D 5/282 416/220 R |

FOREIGN PATENT DOCUMENTS

| | | |
|---|---|---|
| EP | 1 985 809 A2 | 10/2008 |
| EP | 2206892 A2 | 7/2010 |
| JP | 2002-201903 A | 7/2002 |

OTHER PUBLICATIONS

Sep. 28, 2015 Search Report issued in European Patent Application No. 15 16 4608.
Nov. 10, 2014 Search Report issued in GB1408463.6.

* cited by examiner

Primary Examiner — Nathaniel Wiehe
Assistant Examiner — Brian O Peters
(74) Attorney, Agent, or Firm — Oliff PLC (57) ABSTRACT A test blade for use in a blade-release test in which the blade is mounted on a rotatable hub and at least a portion of the blade is released therefrom by the action of a controlled explosion. The blade has a root portion for mounting on said rotatable hub and the root portion comprises a radially inner surface having a channel extending at least partly along or proximal the camber line. The channel is for receiving at least one explosive charge and at least one detonator which may be contained within a charge carrier.

18 Claims, 7 Drawing Sheets

TEST BLADE

FIELD OF THE INVENTION

The present invention relates to a test blade and/or to a method of preparing a test blade and is concerned particularly, but not exclusively, with a fan blade modified for an explosive release test, and/or to a method for preparing such a blade.

BACKGROUND

A gas turbine jet engine includes a number of sets of blades that are mounted on rotational hubs. These include fan blades, turbine blades and compressor blades, all of which rotate at high speed. In use, it is possible, although extremely unlikely, for a blade or part of a blade to become detached from the hub on which it is mounted whilst rotating. This results in the blade impacting its trailing blade and surrounding engine casing at high speed. Due to the mass and speed of the blade, the force at which impact occurs can be very high. It is therefore important that any damage caused by such an impact is not critical. Tests are therefore carried out to evaluate the damage which would be caused by the release of a blade during operation, in order to allow for appropriate design measures to be taken.

A known test method comprises detonating an explosive charge located within the blade, close to the root of the blade, thus causing the blade to be released from the hub. This is done by machining a hole along the camber line of the blade close to the edge of the bedding (i.e. that portion of the hub which retains the root of the blade). An aluminium carrier containing an explosive charge is located in the centre of the hole and detonators are placed either side of the charge towards the leading and trailing edges of the blade. At a precisely pre-determined time, when the blade is rotating on the hub at maximum speed, the explosive charge is detonated. This causes the blade to become detached from the hub, and to impact its trailing blade and surrounding engine casing. The damage caused by the impact can then be evaluated.

Since the purpose of the test is to evaluate the damage caused by the blade, it is important that the explosive release of the blade does not significantly alter the blade's structural integrity so that a "worst-case" result can be achieved. For example, the blade should not be weakened to the extent where its performance is changed nor to the point that it is released prior to the determined time release. The timing of release must be controlled carefully to ensure that images of the event can be recorded.

When the above-described test is used with a metallic blade, the explosive charge detonation results in a crack that propagates linearly through the shortest section of the blade which bears the critical failure load and the blade fails in tension under the centrifugal force. The blade is released almost instantaneously in a controlled manner and a clean failure surface is left at the blade root. The test can be used for both straight- and curved-rooted blades. However, it can be difficult to accurately machine a curved hole for the explosive charge and detonators that are required for a curved rooted blade.

In a composite blade, a number of layers of fibrous material are bonded together by resin. Radially extending fibres carry the centrifugal force whilst axial and diagonal fibres act to bind the structure together. A composite blade is much stronger in the plane (axial/radial) than in the thickness (circumferential) direction. This is due to the relatively strong layers of fibrous material being bonded together by relatively weak resin.

Due to the structure of a composite blade, a number of problems occur when the above described method is used to release a composite blade. In particular, when the blade fails due to the explosion, a linear crack does not propagate through the blade, as happens for a metallic blade. In order to ensure that a composite blade is cleanly detached from the hub almost instantaneously in a controlled manner, a shaped explosive charge must be used that causes enough of the radial fibres to fail under centrifugal force, releasing the blade aerofoil. However, when using explosives, the energy causes the surrounding resin to vaporise, overcoming the weak bonds between composite layers. This means that extensive delamination occurs throughout the blade and the structural integrity of the blade is significantly compromised, which may result in a test result that is less than the desirable "worst case".

In order to help prevent this delamination from occurring, the blade may be reinforced in the thickness (circumferential) direction using Kevlar stitching in a region above the explosive charge. However, the Kevlar stitching requires a number of small holes to be drilled through the blade which reduces the strength of the blade in the radial direction, and also reduces its resistance to twisting.

EP2206892 proposes machining two charge holes, one from each of the leading and trailing edges of the aerofoil blade root towards the central point of the camber line of the blade, and two detonator holes from the underside of the blade root, each detonator hole intersecting one of the charge holes. A slot extending through the entire thickness (circumferential direction) of the blade is formed in alignment with the intersections between the charge and detonator holes to reduce the radial strength of the blade (by pre-severing some of the radially-extending fibres in the blade) so that during an explosive release test, the blade is immediately released upon detonation of the charges and delamination is prevented in the area above the slot. Delamination is further prevented by Kevlar stitching provided in reinforcement areas above the charge holes.

SUMMARY OF THE INVENTION

According to a first aspect of the present invention there is provided a test blade for use in a blade-release test in which the blade is mounted on a rotatable hub and at least a portion of the blade is released therefrom by the action of a controlled explosion, the blade having a root portion for mounting on said rotatable hub, wherein the root portion comprises a channel extending in a direction extending from the leading edge to the trailing edge (e.g. at least partly along or proximal to the camber line) (for example, the root portion may be considered to comprise an inner surface having a channel), said channel for receiving at least one explosive charge and at least one detonator.

By providing a channel on the radially inner surface of the root portion, the ease of manufacture of the test blade is improved because it is much easier to machine a channel into the surface of the root portion than drill bores into the root portion. This means that it is possible to apply the invention to either a straight-rooted blade or to a curved-rooted blade. The open nature of the channel (compared to a bore within the root portion) allows flexibility in the size, position and orientation of the explosive charges. Furthermore, by positioning on or proximal the camber line and thus spacing it from the pressure and suction faces of the blade, the structural integrity and strength of the root portion is maintained. The load carrying capability of the root portion is improved as stresses in the test blade are reduced. The quantity of explosive in the charge can be reduced which leads to less secondary explosive damage.

In the present application a test blade is a blade not intended for use on an on-wing gas turbine engine.

The term camber line is well understood in the art, but generally it refers to the line that extends mid-way between a pressure surface and a suction surface of the blade.

The root portion may be considered to comprise an inner surface having a channel.

The channel may be considered to be an open channel.

Optional features of the invention will now be set out. These are applicable singly or in any combination with any aspect of the invention.

An aerofoil blade typically comprises radially extending leading and trailing edges axially spaced by a (concave) pressure surface and a circumferentially opposed (convex) suction surface. The camber line is the line extending from the leading edge to the trailing edge of the blade midway between the pressure and suctions surfaces of the blade.

In some embodiments, the channel extends along or proximal to the camber line of the radially inner surface to the leading edge and/or the trailing edge of the root portion. Where it extends to both edges, the channel extends along or proximal the entire length of the camber line on the radially inner surface.

The channel extends radially into the root portion of the blade. In some embodiments, the channel has a curved profile at its radially outermost inner surface.

The channel may have a width (in the thickness/circumferential direction) of greater than 20 mm. The distance in the width/thickness/circumferential direction from the channel to the pressure/suction face may be between 5 and 10 mm. It will be equal either side of the channel if the channel is along the chamber line but will be unequal is it is only proximal the camber line.

In some embodiments, the root portion increases in thickness (in the circumferential direction) towards the radially inner surface such that the leading and trailing edges of the root portion increase in surface area towards the radially inner surface. This is to allow mounting of the root portion in a dovetail arrangement in a corresponding groove in the rotatable hub where the groove has a decreasing width towards the radially outer surface of the hub such that the root potion is held in compression upon application of centrifugal force.

In some embodiments, the pressure and/or suction face(s) of the root portion comprise a coating for reducing the effect of localized contact stresses on the sub-surface of the root-portion. The coating may be formed, for example, of glass reinforced plastic (GRP) or carbon fibre reinforced plastic (CFRP).

In some embodiments, the root portion further comprises at least one axially extending slot provided towards at least one of the axially outer ends of the channel e.g. extending from the leading or trailing edge of the root portion towards the axial centre. For example, there may be an axially extending slot extending from each of the leading and trailing edges of the root portion at each of the suction and pressure surfaces (i.e. either side of the channel).

The or each axially extending slot may extend through the root portion in the thickness (circumferential) direction (from the pressure surface or the suction surface of the root portion) to join the channel.

The axial slots are to provide areas of radial weakness at the axially outer ends of the channel which is where, in use, the detonators are positioned. The force of the explosion is reduced in these areas (by the absence of explosive charge) and the slots are provided to ensure cleaving of the blade from the root portion in these areas especially in static tests (where no centrifugal force is applied to the test blade) which are preliminary tests used to confirm that successful cleaving of the blade occurs and to assess the kinetic energy imparted to the cleaved blade portion.

The test blade may be reinforced in the thickness (circumferential) direction to reduce delamination using stitching (e.g. Kevlar stitching) in a region proximal the root portion.

The blade may comprise a composite blade e.g. a blade formed of fibre-reinforced plastics material. The blade may be a turbine blade, a fan blade or a compressor blade.

During the test, the channel contains at least one explosive charge and at least one detonator. The at least one explosive charge and at least one detonator may be provided in a charge carrier having an axial extension coincident with the channel.

The charge carrier may have a first (axially and radially extending) portion for insertion into the channel.

The first portion may have smaller dimensions (e.g. smaller radial and/or circumferential dimensions) than the channel such that there is spacing between the first portion and the channel which can be filled with adhesive and/or damping material.

The first portion may have an upper section shaped as a semi-circular prism for location proximal the curved radially outermost inner surface of the channel. The radius of curvature of the upper section may be less than that of the curved radially outermost inner surface of the channel such that upper section is spaced from the curved radially outermost inner surface of the channel.

The charge carrier may have a second portion projecting laterally/circumferentially from the first portion and having a surface for abutting the radially inner surface of the root portion. The second portion may comprise at least one flange e.g. a circumferentially and axially extending flange. It may comprise two axially extending flanges on opposing axially extending sides of the first portion.

The charge carrier may comprise at least one bore and/or at least one channel extending parallel to the axis of the charge carrier. Two channels may be provided in the upper section of the charge carrier on opposing curved surfaces of the semi-circular prism.

The charge carrier may comprise a channel extending perpendicularly to the axis of the charge carrier from the second portion into the first portion from an end face of the charge carrier.

The charge carrier may be formed of aluminium.

According to a second aspect of the present invention, there is a charge carrier for insertion into a test blade according to the first aspect, wherein the charge carrier has first, axially elongated portion for insertion into the channel and a second portion projecting laterally from the first portion and having a surface for abutting the radially inner surface of the root portion.

The first portion may have smaller dimensions (e.g. height (radial) and/or width (lateral/circumferential) dimensions) than the channel such that there is spacing between the first portion and the channel which can be filled with adhesive and/or damping material.

The first portion may have an upper section shaped as a semi-circular prism for location proximal the curved radially outermost inner surface of the channel. The radius of curvature of the upper section may be less than that of the curved radially outermost inner surface of the channel such that upper section is spaced from the curved radially outermost inner surface of the channel.

The second portion may comprise at least one axially and laterally (circumferentially) extending flange. It may comprise two axially and laterally extending flanges on opposing axially extending sides of the first portion.

The charge carrier may comprise at least one bore and/or at least one channel extending parallel to the axial extension of the first portion. Two channels may be provided in the upper section of the charge carrier on opposing curved surfaces of the semi-circular prism.

The charge carrier may comprise a channel extending perpendicularly to the axis of the charge carrier from the second portion into the first portion from an end face of the charge carrier.

The charge carrier may be formed of aluminium.

According to a third aspect of the present invention there is a test apparatus comprising a test blade according to the first aspect (optionally including a charge carrier according to the second aspect) and a rotatable hub, wherein the root portion of the blade is mounted in a groove on said rotatable hub.

The groove may have a narrower width towards the radially outer surface of the hub such that the root potion is held in compression upon application of centrifugal force. Where the channel in the root portion contains a charge carrier, the charge carrier is also held under compression which increases the load carrying capability of the root section.

According to a fourth aspect of the invention there is provided a method of preparing a test blade for use in a blade release test in which the blade is mounted on a rotatable hub and at least a portion of the blade is released therefrom by the action of a controlled explosion, the method comprising providing the blade with a channel extending at least partly along or proximal a camber line along a radially inner surface of a root portion of said blade, the root portion for mounting on said rotatable hub and the channel for receiving at least one explosive charge and at least one detonator.

In some embodiments, the method comprises providing the channel extending along or proximal the camber line of the radially inner surface to the leading edge and/or the trailing edge of the root portion, e.g. providing the channel extending along or proximal the entire length of the camber line on the radially inner surface.

In some embodiments, the method comprises forming a curved profile at the radially outermost inner surface of the channel.

In some embodiments, the method comprises forming the channel with a width (in the thickness/circumferential direction) of greater than 20 mm. The distance in the width/thickness/circumferential direction from the channel to the pressure/suction face may be formed between 5 and 10 mm. It will be equal either side of the channel if the channel is along the chamber line but will be unequal is it is only proximal the camber line.

In some embodiments, the method comprises forming the root portion with an increasing thickness (in the circumferential direction) towards the radially inner surface such that the leading and trailing edges of the root portion increase in surface area towards the radially inner surface.

In some embodiments, the method comprises forming a coating e.g. a GRP or CFRP coating on the pressure and/or suction face(s) of the root portion.

In some embodiments, the method comprises forming at least one axially extending slot towards at least one of the axially outer ends of the channel e.g. extending from the leading or trailing edge of the root portion towards the axial centre. For example, the method may comprise forming an axially extending slot extending from each of the leading and trailing edges of the root portion at each of the suction and pressure surfaces (i.e. either side of the channel).

The or each axially extending slot may be formed so as to extend through the root portion in the thickness (circumferential) direction (from the pressure surface or the suction surface of the root portion) to join the channel.

The method may comprise reinforcing the blade in the thickness/circumferential direction in a region proximal the root portion using stitching (e.g. Kevlar stitching) to reduce delamination, The method may comprise forming the blade of a composite material e.g. fibre-reinforced plastics material. The method may comprise forming a turbine blade, a fan blade or a compressor blade.

According to a fifth aspect of the present invention there is a method of preparing a test apparatus comprising preparing a test blade according to the third aspect and mounting the test blade in a groove on the rotatable hub.

The method may comprise forming the groove on the rotatable hub with a narrower width towards the radially outer surface of the hub such that the root potion is held in compression upon application of centrifugal force.

The method may comprise providing at least one explosive charge and at least one detonator in said channel prior to mounting the root portion in the groove on the rotatable hub.

The at least one explosive charge and at least one detonator may be provided in the channel within a charge carrier having an axial extension coincident with the channel (as described above for the first and second aspect).

The method may comprise inserting the first portion of the charge carrier into the channel on the radially inner surface of the root portion. The first portion may have smaller dimensions (e.g. radial and/or circumferential dimensions) than the channel such that there is spacing between the first portion and the channel and the method may comprise filling the spacing with adhesive and/or damping material.

The first portion may have an upper section shaped as a semi-circular prism which is located proximal the curved radially outermost inner surface of the channel. The radius of curvature of the upper section may be less than that of the curved radially outermost inner surface of the channel such that upper section is spaced from the curved radially outermost inner surface of the channel.

The method may comprise arranging the charge carrier with the second portion abutting the radially inner surface of the root portion.

According to a sixth aspect of the present invention there is provided a gas turbine engine comprising a test blade or a test apparatus according to the first or second aspect.

BRIEF DESCRIPTION OF THE DRAWINGS

Embodiments of the invention will now be described by way of example with reference to the accompanying drawings in which.

DETAILED DESCRIPTION

Figure 1:
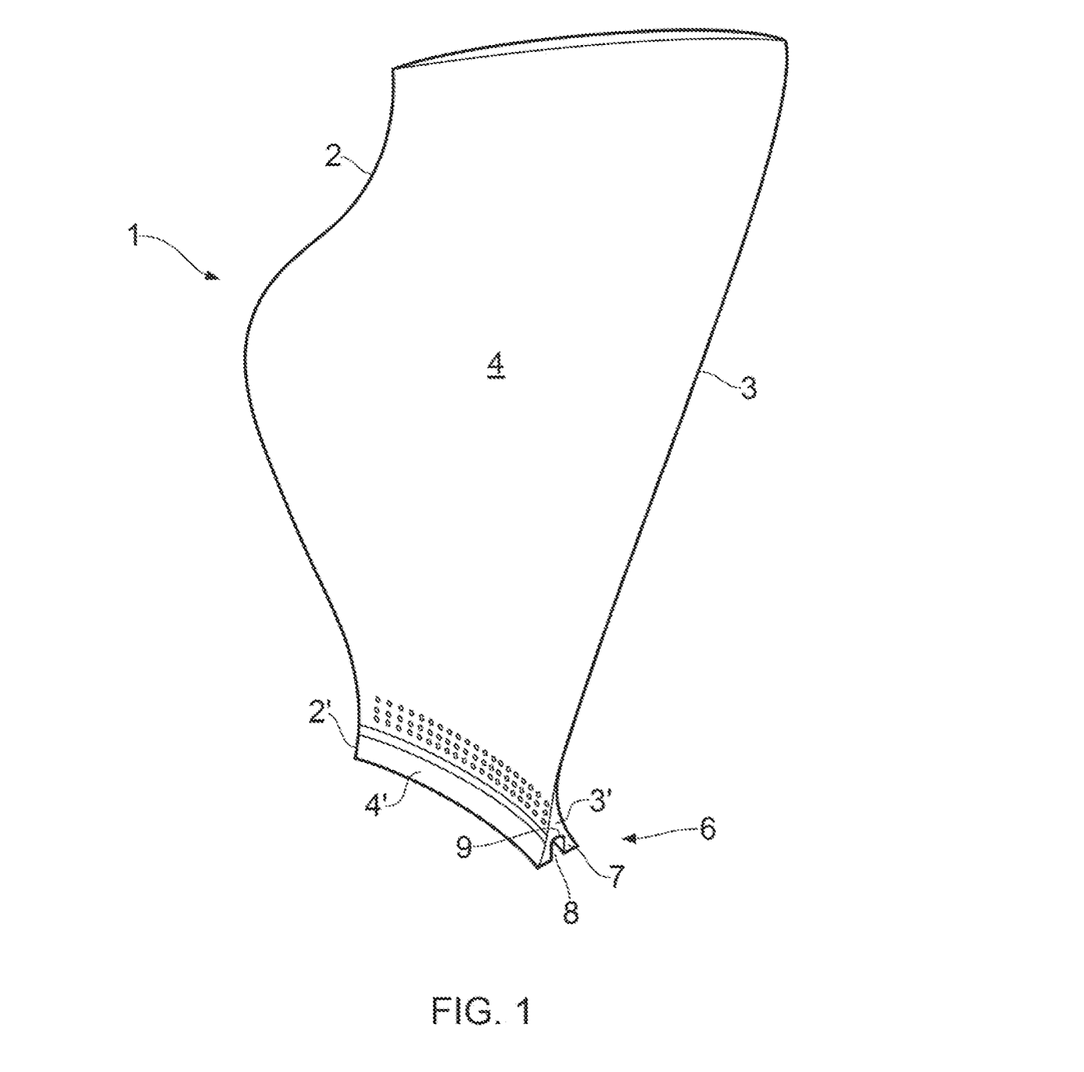
FIG. 1 shows a perspective view of a test blade according to a first embodiment.
Figure 2:
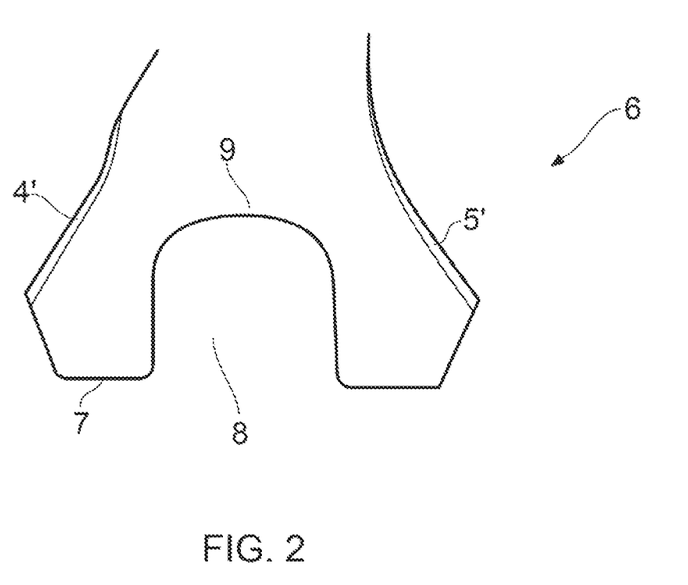
FIG. 2 shows a radial cross-sectional view through the test blade shown in FIG. 1.

A first embodiment of a test blade 1 is shown in FIGS. 1 and 2.

The blade 1 comprises a radially extending leading edge 2 and trailing edge 3 axially spaced by a (concave) pressure surface 4 and a circumferentially opposed (convex) suction surface 5. The camber line extends from the leading edge 2 to the trailing edge 3 of the blade 1 midway between the pressure and suctions surfaces 4, 5 of the blade 1.

Figure 3:
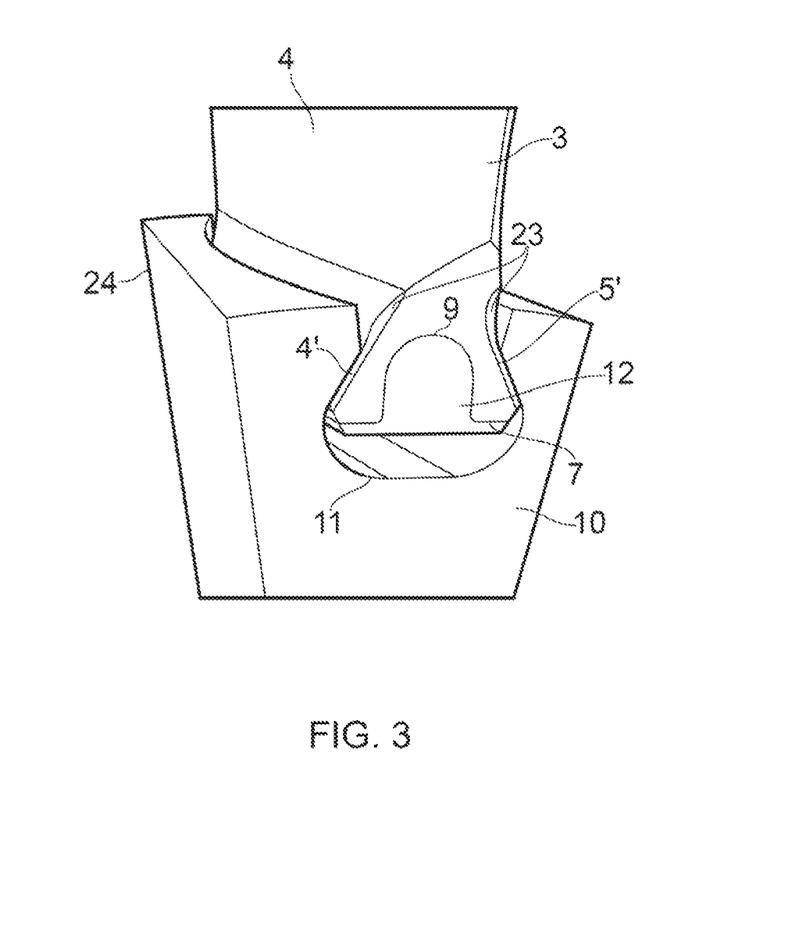
FIG. 3 shows the test blade of FIGS. 1 and 2 mounted in a rotatable hub.

The blade 1 has a root portion 6 for mounting on a rotatable hub 10 (shown in FIG. 3).

The root portion 6 comprises a radially inner surface 7 having a channel 8 extending along the entire length of the camber line of the radially inner surface 7 to the leading edge 2' and the trailing edge 3' of the root portion 6.

By providing a channel on the radially inner surface 7 of the root portion 6, the ease of manufacture of the test blade 1 is improved because it is much easier to machine a channel 8 into the surface of the root portion than drill bores into the root portion 6. This means that it is possible to apply the channel to either a straight-rooted blade (as shown in the figures) or to a curved-rooted blade. By positioning the channel 8 on the camber line and thus spacing it from the pressure and suction faces 4', 5' of the root portion 6, the structural integrity and strength of the root portion 6 is maintained.

The channel 8 extends radially into the root portion 6 of the blade 1 and has a curved profile at its radially outermost inner surface 9.

The root portion 6 increases in thickness (in the circumferential direction) towards the radially inner surface 7 such that the leading and trailing edges 2', 3' of the root portion 6 increase in surface area towards the radially inner surface 7.

In some embodiments, the pressure and suction face 4', 5' of the root portion 6 comprise a glass reinforced plastic coating 23 (see FIG. 3).

The test blade 1 is mounted in a rotatable hub 10 within a groove 11 as shown in FIG. 3.

The groove 11 has a narrower width towards the radially outer surface 24 of the hub 10. The root portion 6 is held in a dovetail arrangement within the groove 11 so that it is in compression under application of centrifugal force.

Prior to mounting the root portion 6 within the groove, 11, a charge carrier 12 housing at least one explosive charge and at least one detonator is fitted into the channel 8.

The open nature of the channel 8 (compared to a bore within the root portion) allows flexibility in the size, position and orientation of the explosive charge/detonator.

The charge carrier 12 is also under compression within the groove 11 and thus increases the load carrying capabilities of the root portion.

Figure 4:
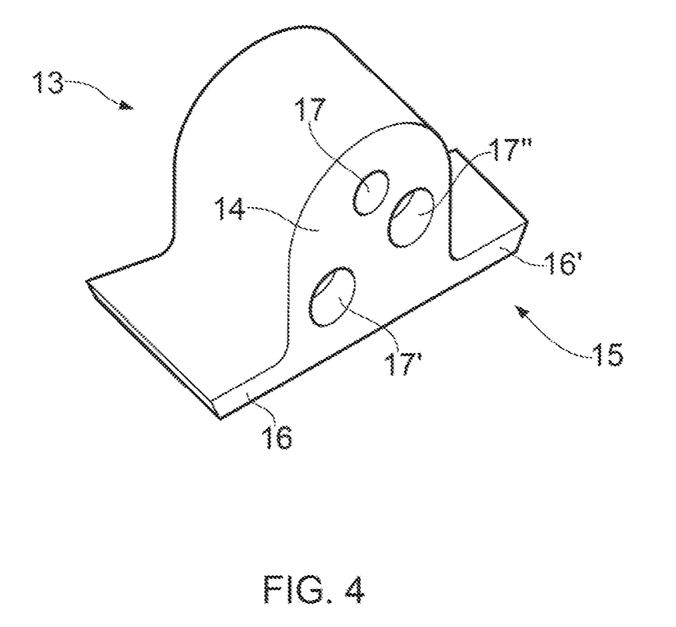
FIGS. 4 to 6 show perspective or cross-sectional views of a charge carrier for use with a test blade.
Figure 5:
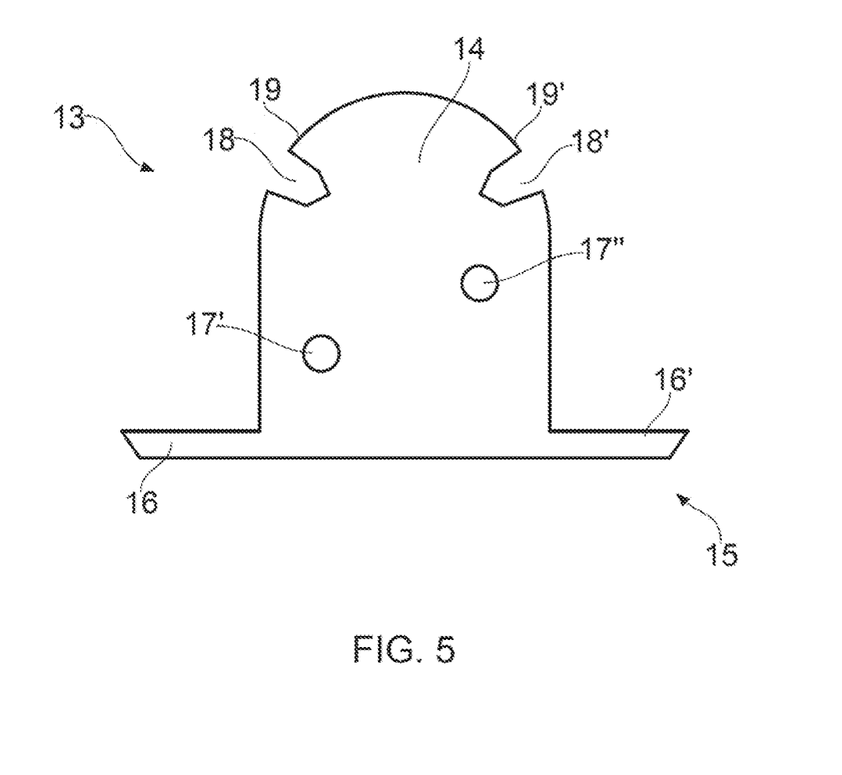
Figure 6:
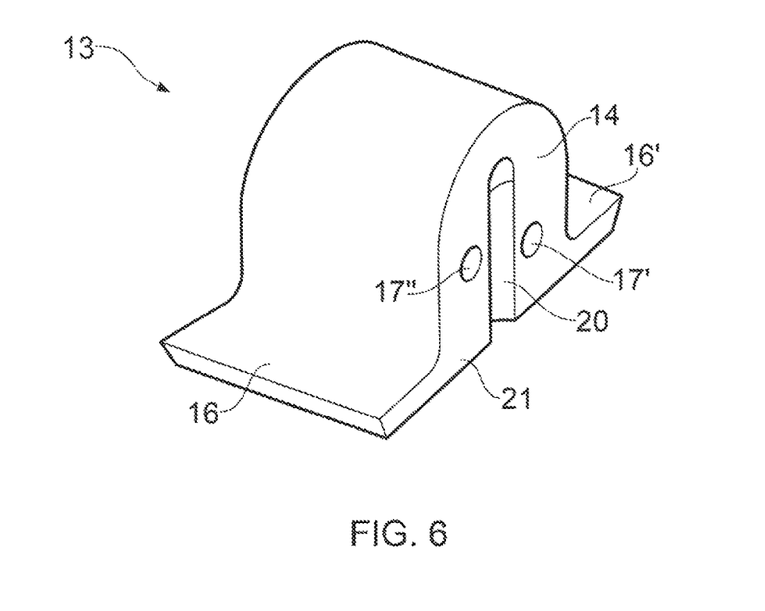

Suitable charge carriers are shown FIGS. 4-6.

The charge carrier 12 has a first portion 13 for insertion into the channel 8. The first portion 13 may has smaller dimensions than the channel 8 such that there is spacing between the first portion 13 and the channel 8 which can be filled with adhesive and/or damping material.

The first portion 13 has an upper section 14 shaped as a semi-circular prism for location proximal the curved radially outermost inner surface 9 of the channel 8. The radius of curvature of the upper section 14 is less than that of the curved radially outermost inner surface 9 of the channel 8 such that upper section 14 is spaced from the curved radially outermost inner surface 9 of the channel 8.

The charge carrier 12 has a second portion 15 comprising flanges 16, 16' for abutting the radially inner surface 7 of the root portion 6 either side of the channel 8.

The charge carrier 12 may comprise a plurality of bores 17, 17', 17'' as shown in FIG. 4

The charge carrier 12 may comprise two bores 17, 17' and two channels 18, 18' extending parallel to the axis of the charge carrier 12 as shown in FIG. 5. The two channels 18, 18' are provided in the upper section 14 of the first portion 13 of the charge carrier 12 on opposing curved surfaces 19, 19' of the semi-circular prism.

The charge carrier 12 may comprise two bores 17, 17' and a channel 20 extending perpendicularly to the axis of the charge carrier 12 from the second portion 15 into the first portion 13 from an end face 21 of the charge carrier 12 as shown in FIG. 6.

In an explosive release test, the explosive charge detonation results in almost instantaneous release of the blade in a controlled manner. A clean failure surface is left at the blade root.

Figure 7:
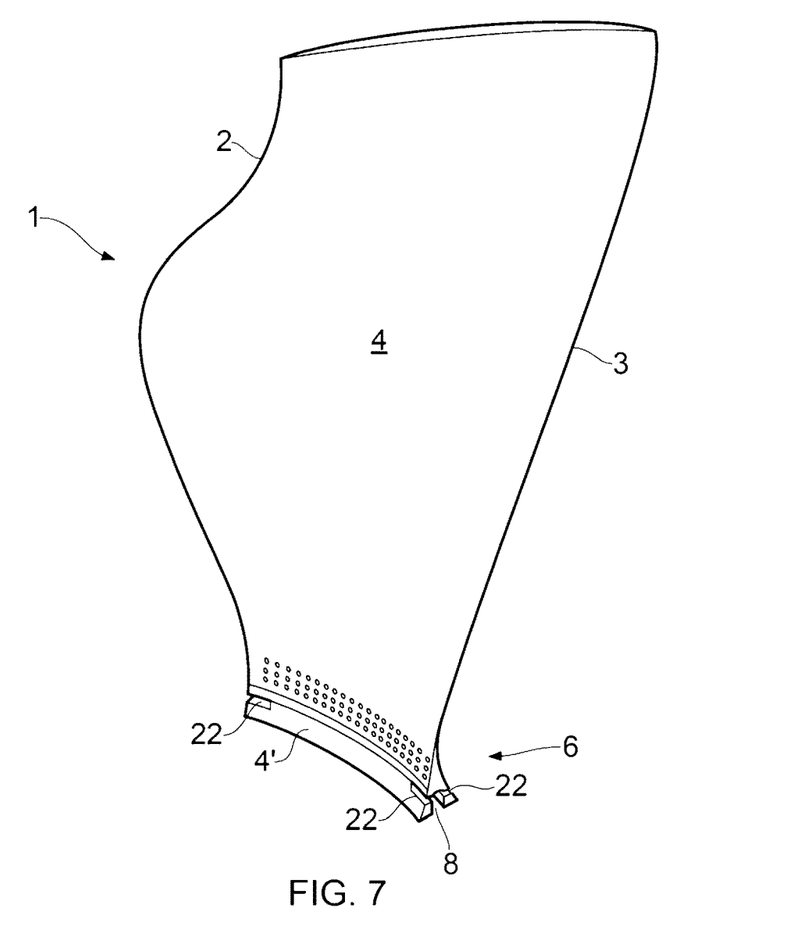
FIG. 7 shows a front perspective view of a test blade according to a second embodiment.
Figure 8:
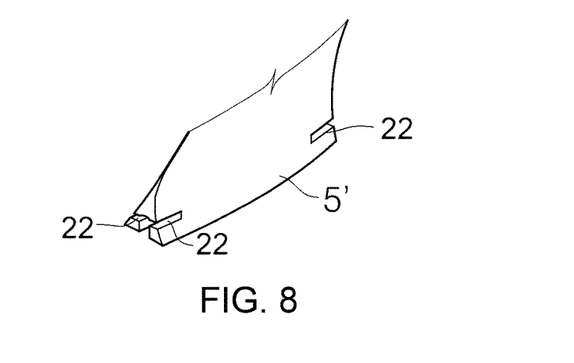
FIG. 8 shows a back perspective view of a portion of a test blade according to the second embodiment.

In the second embodiment shown in FIGS. 7 and 8, the root portion 6 further comprises axially extending slots 22 extending from both the leading and trailing edges 2', 3' on both the suction surface 5' and pressure surface 4' of the root portion 6.

Each axially extending slot 22 extends through the root portion 6 in the thickness (circumferential) direction (from the pressure surface 4' or the suction surface 5' of the root portion 6) to join the channel 8.

The axial slots 22 in the second embodiment are to provide areas of radial weakness at the axially outer ends of the channel which is where, in use, the detonators are positioned. The force of the explosion is reduced in these areas (by the absence of explosive charge) and the slots are provided to ensure cleaving of the blade from the root portion in these areas especially in static tests (where no centrifugal force is applied to the test blade).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A test blade for use in a blade-release test in which the blade is mounted on a rotatable hub and at least a portion of the blade is released therefrom by the action of a controlled explosion, the blade having a root portion for mounting on said rotatable hub, wherein the root portion comprises a radially inner surface having a channel extending at least partly along or proximal a camber line, said channel for receiving at least one explosive charge and at least one detonator within a charge carrier, the charge carrier having a first portion for insertion into the channel and a second portion having a surface for abutting the radially inner surface of the root portion.

2. The test blade according to claim 1 wherein the channel extends along or proximal the entire length of the camber line of the radially inner surface to the leading edge and the trailing edge of the root portion.

3. The test blade according to claim 1 wherein the channel has a curved profile at its radially outermost inner surface.

4. The test blade according to claims 1 wherein the root portion increases in thickness (in the circumferential direction) towards the radially inner surface such that the leading and trailing edges of the root portion increase in surface area towards the radially inner surface.

5. The test blade according to claim 1 wherein the root portion further comprises at least one axially extending slot provided towards at least one of axially outer ends of the channel.

6. The test blade according to claim 1 wherein the root portion comprises axially extending slots extending from each of the leading and trailing edges of the root portion at each of the suction and pressure surfaces.

7. The test blade according to claim 6 wherein one or more of the axially extending slots extends through the root portion in the thickness (circumferential) direction to join the channel.

8. The test blade according to claim 1 wherein the charge carrier has an axial extension coincident with the channel.

9. The test blade according to claim 1 wherein the first portion has smaller dimensions than the channel such that there is spacing between the first portion and the channel.

10. The test blade according to claim 1 wherein the first portion has an upper section shaped as a semi-circular segment for location proximal the radially outermost inner surface of the channel.

11. A test apparatus comprising the test blade according to claim 1 and the rotatable hub, wherein the root portion of the blade is mounted in a groove on said rotatable hub.

12. The test apparatus according to claim 11 wherein the groove has a narrower width towards the radially outer surface of the hub.

13. A charge carrier for insertion into a test blade for use in a blade-release test in which the blade is mounted on a rotatable hub and at least a portion of the blade is released therefrom by the action of a controlled explosion, the blade having a root portion for mounting on said rotatable hub, wherein the root portion comprises a radially inner surface having a channel extending at least partly along or proximal a camber line, said channel for receiving at least one explosive charge and at least one detonator, the charge carrier comprising:

a first axially extending portion for insertion into the channel; and a second portion projecting laterally from the first portion and having a surface for abutting the radially inner surface of the root portion.

14. The charge carrier according to claim 13 wherein the first portion has an upper section shaped as a semi-circular segment.

15. The charge carrier according to claim 13 wherein the second portion comprises at least one axially extending flange.

16. The charge carrier according to claim 15 wherein the second portion comprises two axially extending flanges on opposing axially extending sides of the first portion.

17. The charge carrier according to claim 13 comprising at least one bore and/or at least one channel extending parallel to the axial extension of the first portion.

18. A method of preparing a test blade for use in a blade release test in which the blade is mounted on a rotatable hub and at least a portion of the blade is released therefrom by the action of a controlled explosion, the method comprising providing the blade with a channel extending at least partly along or proximal a camber line along a radially inner surface of a root portion of said blade, the root portion for mounting on said rotatable hub and the channel for receiving at least one explosive charge and at least one detonator within a charge carrier, the charge carrier having a first portion for insertion into the channel and a second portion having a surface for abutting the radially inner surface of the root portion.

\* \* \* \* \*